United States Patent
Singh et al.

(10) Patent No.: US 12,265,631 B1
(45) Date of Patent: Apr. 1, 2025

(54) SYSTEM AND METHOD TO ANALYZE SECURITY ACROSS DIGITAL ENVIRONMENTS

(71) Applicant: Onix Networking Corp., New York, NY (US)

(72) Inventors: Ramnish Singh, Sammamish, WA (US); Gaurav Aggarwal, Bothell, WA (US); Anantha Balasubramanian, Bangalore (IN); Balaji Ramakrishnan, Hyderabad (IN); Rajesh Kannan, Bangalore (IN)

(73) Assignee: Onix Networking Corp.

( * ) Notice: Subject to any disclaimer, the term of this patent is extended or adjusted under 35 U.S.C. 154(b) by 0 days.

(21) Appl. No.: 18/940,914

(22) Filed: Nov. 8, 2024

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
None
See application file for complete search history.

(56) References Cited

U.S. PATENT DOCUMENTS

| 2019/0327260 | A1* | 10/2019 | Adamson | H04L 43/065 |
| 2021/0059479 | A1* | 3/2021 | Khokhar | A47K 3/125 |
| 2022/0210202 | A1 | 6/2022 | Crabtree et al. | |
| 2023/0169175 | A1* | 6/2023 | Ananthapur | G06F 21/577 726/25 |
| 2024/0143781 | A1* | 5/2024 | Bubshait | G06F 21/577 |

FOREIGN PATENT DOCUMENTS

| CN | 115033894 A | 9/2022 |
| CN | 116167053 A | 5/2023 |
| CN | 116305137 A | 6/2023 |

* cited by examiner

*Primary Examiner* — Fatoumata Traore
(74) *Attorney, Agent, or Firm* — Jason C. Cameron

(57) ABSTRACT

A system and method to analyze security across digital environments is provided. The system includes a report generation module to generate reports stating vulnerabilities in a software delivery pipeline. A recommendation engine is configured to perform a comprehensive analysis of the reports, verifies by cross-referencing with a CVE database to provide a rationalized and comprehensive view of the vulnerabilities. Further, the recommendation engine is configured to conduct an impact analysis using a ML model to determine the consequence of fixing the vulnerabilities and generates a score matrix based on a predefined threshold limit. Recommendations are provided to resolve the vulnerabilities based on the score matrix generated and impact analysis. The system includes a vulnerability remediation module to utilize the threshold limit to initiate automated vulnerability remediation thereby ensuring a secure and reliable development process.

12 Claims, 5 Drawing Sheets

SYSTEM AND METHOD TO ANALYZE SECURITY ACROSS DIGITAL ENVIRONMENTS

FIELD OF INVENTION

Embodiments of the present disclosure relate to the field of cyber security, and more particularly, a system and a method to analyze security across digital environments.

BACKGROUND

Vulnerability assessment is a critical component of cyber security that involves systematically identifying, evaluating and prioritizing security weaknesses in an organization's systems, applications, networks and infrastructure. Traditional vulnerability assessments are often conducted periodically (for instance, quarterly or annually), which may leave gaps between assessments during which new vulnerabilities could be introduced. Without continuous monitoring, organizations may remain unaware of vulnerabilities that arise in between assessment periods.

Further, not all vulnerabilities carry the same level of risk for every organization. A vulnerability assessment may identify numerous issues, but without proper context, it can be difficult to prioritize which ones pose the greatest threat. This can lead to a misallocation of resources, where less critical vulnerabilities are addressed before more critical ones.

Furthermore, even after vulnerabilities are identified, several organizations may face challenges in addressing them. A critical challenge is the dependency issue where fixing one vulnerability could inadvertently create another or negatively impact other systems or applications.

Hence, there is a need for an improved system and method for analyze security across digital environments which addresses the aforementioned issue(s).

OBJECTIVE OF THE INVENTION

An objective of the present invention is to provide an artificial intelligence (AI) driven secure software supply chain system to resolve vulnerabilities.

Another objective of the present invention is to identify and categorize the impact of implementing vulnerabilities in applications, operating systems, containers, databases, networks and so on.

Yet another objective of the present invention is to initiate automated vulnerability remediation based on scoring metrics and an impact analysis thereby ensuring a secure and reliable software development process.

BRIEF DESCRIPTION

In accordance with an embodiment of the present disclosure, a computer-implemented system for analyze security across digital environments is provided. The computer-implemented system includes a hardware processor, and a memory coupled to the hardware processor. The memory comprises a set of program instructions in the form of a processing subsystem hosted on a server and configured to execute on a network to control bidirectional communications among a plurality of modules. The processing subsystem includes a report generation module configured to generate a plurality of reports stating one or more identified vulnerabilities pertaining to multiple components of a software delivery pipeline. The plurality of reports includes application vulnerability scan report, operating system vulnerability scan report, container image vulnerability report and network vulnerability report. The processing subsystem also includes a recommendation engine operatively coupled to the report generation module wherein the recommendation engine is configured to perform a comprehensive analysis of the plurality of reports. The recommendation engine is also configured to verify the plurality of reports by cross-referencing with a common vulnerabilities and exposures database to provide a rationalized and comprehensive view of the one or more identified vulnerabilities. Further, the recommendation engine is configured to conduct an impact analysis on the implementation of the recommendation engine using a machine learning model to determine the consequence of fixing the one or more vulnerabilities. Furthermore, the recommendation engine is configured to generate a score matrix based on an impact with a predefined threshold limit. Moreover, the recommendation engine is configured to provide one or more recommendations to resolve the one or more vulnerabilities based on the score matrix generated and impact analysis. The processing subsystem also includes a vulnerability remediation module operatively coupled to the recommendation engine wherein the vulnerability remediation module is configured to utilize one or more predefined threshold limits generated based on the score matrix to initiate automated vulnerability remediation thereby ensuring a secure and reliable development process.

In accordance with an embodiment of the present disclosure, a computer-implemented method for analyze security across digital environments is provided. The computer-implemented method includes generating, by a report generation module, a plurality of reports stating one or more identified vulnerabilities pertaining to multiple components of a software delivery pipeline. The plurality of reports comprises application vulnerability scan report, operating system vulnerability scan report, container image vulnerability report and network vulnerability report. The computer-implemented method includes categorizing, by the report generation module, the plurality of reports based on multiple levels of impact. The computer-implemented method includes performing, by a recommendation engine, a comprehensive analysis of the plurality of reports. The computer-implemented method includes verifying, by the recommendation engine, the plurality of reports by cross-reference with a common vulnerabilities and exposures database to provide a rationalized and comprehensive view of the one or more identified vulnerabilities. The computer-implemented method includes conducting, by the recommendation engine, an impact analysis on the implementation of the recommendation engine using a machine learning model. Further, the computer-implemented method includes generating, by the recommendation engine, a score matrix based on an impact with a predefined threshold limit. Furthermore, the computer-implemented method includes providing, by the recommendation engine, one or more recommendations to resolve the one or more vulnerabilities based on the score matrix generated and impact analysis. Moreover, the computer-implemented method includes utilizing, by a vulnerability remediation module, one or more predefined threshold limits generated based on the score matrix to initiate automated vulnerability remediation thereby ensuring a secure and reliable development process.

In accordance with another embodiment of the present disclosure, a non-transitory computer-readable medium storing a computer program that, when executed by a processor, causes the processor to perform a computer-implemented method for analyze security across digital environments is provided. The computer-implemented method includes generating, by a report generation module, a plurality of reports stating one or more identified vulnerabilities pertaining to multiple components of a software delivery pipeline. The plurality of reports comprises application vulnerability scan report, operating system vulnerability scan report, container image vulnerability report and network vulnerability report. The computer-implemented method includes categorizing, by the report generation module, the plurality of reports based on multiple levels of impact. The computer-implemented method includes performing, by a recommendation engine, a comprehensive analysis of the plurality of reports. The computer-implemented method includes verifying, by the recommendation engine, the plurality of reports by cross-reference with a common vulnerabilities and exposures database to provide a rationalized and comprehensive view of the one or more identified vulnerabilities. The computer-implemented method includes conducting, by the recommendation engine, an impact analysis on the implementation of the recommendation engine using a machine learning model. Further, the computer-implemented method includes generating, by the recommendation engine, a score matrix based on an impact with a predefined threshold limit. Furthermore, the computer-implemented method includes providing, by the recommendation engine, one or more recommendations to resolve the one or more vulnerabilities based on the score matrix generated and impact analysis. Moreover, the computer-implemented method includes utilizing, by a vulnerability remediation module, one or more predefined threshold limits generated based on the score matrix to initiate automated vulnerability remediation thereby ensuring a secure and reliable development process.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
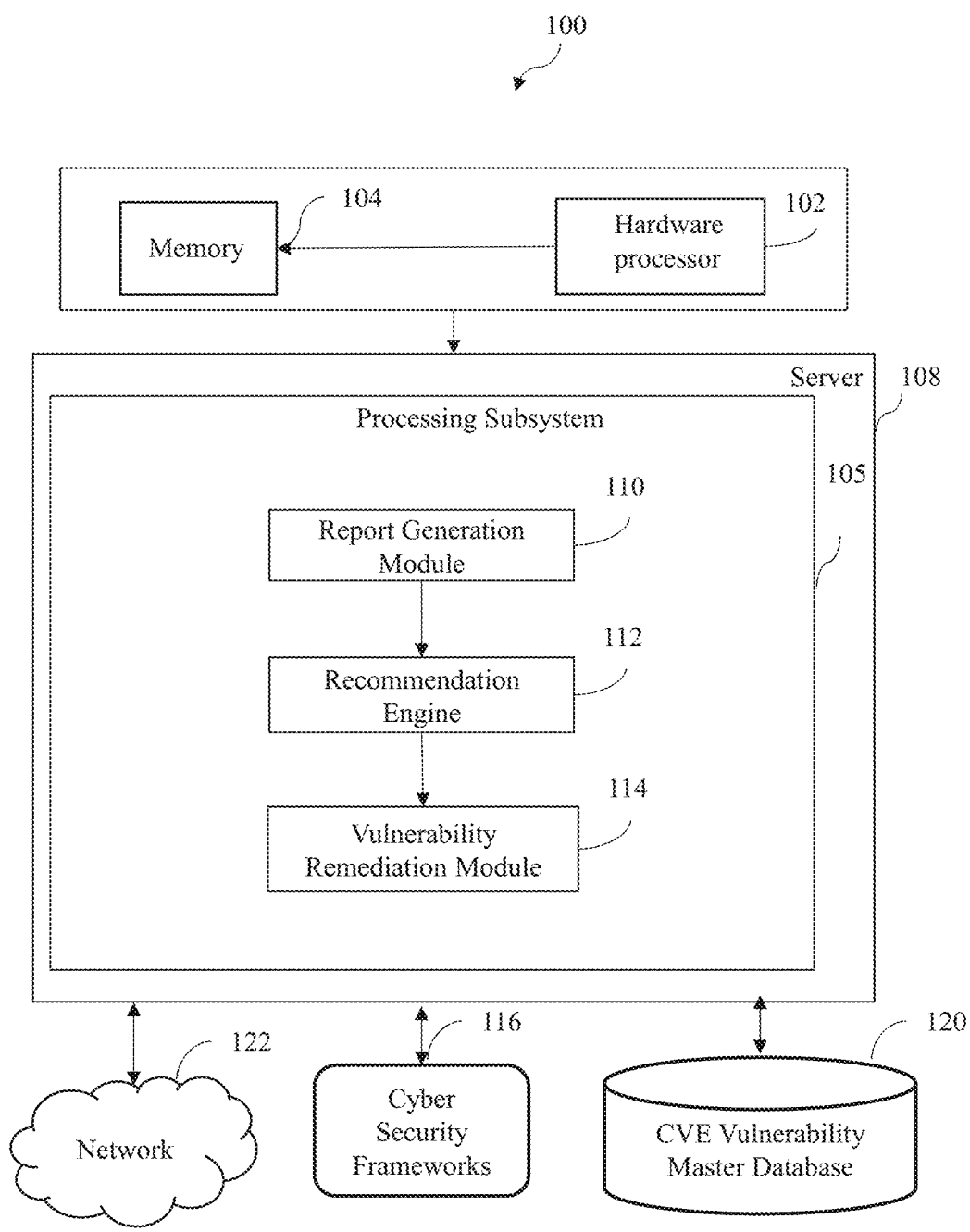
FIG. 1 is a block diagram representation of a computer-implemented system to analyze security across digital environments in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation on the scope of disclosure is thus intended. Such alterations and further modifications in the illustrated computer-implemented system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or subsystems or elements or structures or components preceded by "comprises . . . a" does not, without more constraints, preclude the existence of other devices, sub-systems, elements, structures, components, additional devices, additional sub-systems, additional elements, additional structures, or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

In accordance with an embodiment of the present disclosure, a computer-implemented system to analyze security across digital environments is provided. The computer-implemented system includes a hardware processor, and a memory coupled to the hardware processor. The memory comprises a set of program instructions in the form of a processing subsystem hosted on a server and configured to execute on a network to control bidirectional communications among a plurality of modules. The processing subsystem includes a report generation module configured to generate a plurality of reports stating one or more identified vulnerabilities pertaining to multiple components of a software delivery pipeline. The plurality of reports includes application vulnerability scan report, operating system vulnerability scan report, container image vulnerability report and network vulnerability report. The processing subsystem also includes a recommendation engine operatively coupled to the report generation module wherein the recommendation engine is configured to perform a comprehensive analysis of the plurality of reports. The recommendation engine is also configured to verify the plurality of reports by cross-referencing with a common vulnerabilities and exposures database to provide a rationalized and comprehensive view of the one or more identified vulnerabilities. Further, the recommendation engine is configured to conduct an impact analysis on the implementation of the recommendation engine using a machine learning model to determine the consequence of fixing the one or more vulnerabilities. Furthermore, the recommendation engine is configured to generate a score matrix based on an impact with a predefined threshold limit. Moreover, the recommendation engine is configured to provide one or more recommendations to resolve the one or more vulnerabilities based on the score matrix generated and impact analysis. The processing subsystem also includes a vulnerability remediation module operatively coupled to the recommendation engine wherein the vulnerability remediation module is configured to utilize one or more predefined threshold limits generated based on the score matrix to initiate automated vulnerability remediation thereby ensuring a secure and reliable development process.

FIG. 1 is a block diagram representation of a computer-implemented system to analyze security across digital environments in accordance with an embodiment of the present disclosure. The computer-implemented system 100 includes a hardware processor 102 and a memory 104 coupled to the hardware processor 102. The memory 104 includes a set of program instructions in the form of a processing subsystem 105 and configured to be executed by the hardware processor 102. As used herein, the hardware processor 102 performs data processing, decision making and all general computing tasks and coordinates tasks done by memory, disk storage and other system components. The processing subsystem 105 is hosted on a server 108. In one embodiment, server 108 may include a cloud server. In another embodiment, the server 108 may include a local server. The processing subsystem 105 is configured to execute on a network 122 to control bidirectional communications among a plurality of modules.

In one embodiment, the network 122 may include a wired network such as a local area network (LAN) or Wide Area Network (WAN), such as the Internet. In another embodiment, the network 122 may include both wired and wireless communications according to one or more standards and/or via one or more transport mediums. In one example, the network 122 may include wireless communications according to one of the 802.11 or Bluetooth specification sets, or another standard or proprietary wireless communication protocol. In yet another embodiment, the network 122 may also include communications over a terrestrial cellular network, including, a global system for mobile communications (GSM), code division multiple access (CDMA), and/or enhanced data for global evolution (EDGE) network. Further, the plurality of modules includes a report generation module 110, a recommendation engine 112 and a vulnerability remediation module 114.

The report generation module 110 is configured to generate a plurality of reports stating one or more identified vulnerabilities pertaining to multiple components of a software delivery pipeline. The plurality of reports includes application vulnerability scan report, operating system vulnerability scan report, container image vulnerability report and network vulnerability report. Typically, the plurality of reports examines various aspects of the software delivery pipeline to identify and document the one or more vulnerabilities. Further, the report generation module 110 consolidates data from various sources (for instance, security scanners, monitoring tools, and logs) to provide a comprehensive overview of security risks across the software delivery pipeline.

Typically, the software delivery pipeline refers to a structured automated process that includes several stages to develop, test, deploy and deliver software to end users or stake holders. In one embodiment, the multiple components of the software delivery pipeline includes operating system, applications, containers, databases and network.

In one embodiment, the plurality of reports are verified with a cyber security framework 116. Typically, the cybersecurity framework 116 provides a structured set of standards, guidelines, and best practices for managing cybersecurity risks. Examples of the cybersecurity framework 116 includes, but is not limited to, NIST Cybersecurity Framework, CIS controls and Open Web Application Security Project (OWASP). Further, the verification involves cross-checking the contents of the plurality of reports against the cybersecurity framework 116.

In one embodiment, the report generation module 110 is configured to categorize the plurality of reports based on multiple levels of implementation of the impact. The categorization defines how impactful the identified vulnerabilities are based on their effect on the software delivery pipeline. The impact is reflected in several categories such as critical impact, high impact, medium impact, and low impact. The critical impact refers to the vulnerabilities that pose the highest risk, such as those that could lead to a major breach, loss of sensitive data, or significant operational disruption. These require immediate remediation. Likewise, the high impact refers to the vulnerabilities that could result in considerable harm but may not be as immediately critical. They still need prompt attention. Further, the medium impact refers to vulnerabilities that could have moderate effects, like causing performance degradation or compromising less critical systems. These should be addressed but may not require immediate action. Furthermore, the low impact refers to the vulnerabilities that may not pose an immediate threat or have a low likelihood of exploitation. These can be scheduled for later remediation.

In one embodiment, the impact can also be reflected as business impact, technical impact and compliance impact. The business impact refers to how the vulnerability affects business operations, financial loss, reputation damage and so on. Likewise, the technical impact refers to the severity of the vulnerability in technical terms (for instance, the ability to cause system crashes, data corruption, or unauthorized access). Further, the compliance impact refers to the potential for the vulnerability to lead to non-compliance with regulations, leading to fines or legal action.

Typically, the categorization of the plurality of reports helps prioritize remediation efforts by providing a clear understanding of which vulnerabilities pose the greatest risk and require urgent attention.

The recommendation engine 112 is operatively coupled to the report generation module 110 and is configured to perform a comprehensive analysis of the plurality of reports. The comprehensive analysis of the plurality of reports involves examining these reports in detail to assess the nature, scope and potential impact of the identified vulnerabilities. For instance, common issues, repeated vulnerabilities or emerging threats in the reports are identified. Further, the context of the vulnerabilities and relationship between them is analyzed. Furthermore, the recommendation engine 112 evaluates the potential risk associated with each vulnerability, considering factors like the likelihood of exploitation and the potential damage if exploited.

The recommendation engine 112 is also configured to verify the plurality of reports by cross-referencing with a common vulnerabilities and exposures (CVE) database to provide a rationalized and comprehensive view of the one or more identified vulnerabilities. The CVE database is a publicly available repository that maintains a standardized list of known security vulnerabilities and exposures. It includes unique identifiers for each vulnerability and provides detailed information, such as descriptions, severity scores and potential mitigation strategies. Typically, the verification helps to check the accuracy and validity of the findings in the plurality of reports to ensure that they are accurate, up-to-date, and aligned with recognized security information. Further, cross-referencing involves matching the vulnerabilities identified in the plurality of reports with the corresponding entries in the CVE database. This helps verify if the reported vulnerabilities are recognized, documented, and tracked by the wider security community.

Further, the rationalized view ensures that the identified vulnerabilities are validated against a trusted source (CVE database), removing any duplicates, false positives, or redundant entries. This creates a more streamlined and accurate list of vulnerabilities. Furthermore, the comprehensive view ensures that all relevant information is available for decision-making and prioritizing remediation efforts.

In one embodiment, the common vulnerabilities and exposures (CVE) database is updated with latest vulnerabilities at regular intervals of time. Typically, CVE database is maintained by organizations such as MITRE and the National Vulnerability Database (NVD), and it is widely used by security professionals, software developers, and organizations to stay informed about known vulnerabilities. The CVE database is continually updated to include the latest vulnerabilities as they are discovered and reported. Updating at regular intervals of time means that the system is configured to synchronize or refresh the information in the CVE database periodically for example, every few hours, daily, or weekly. This ensures that the CVE database contains the most current information on known vulnerabilities, allowing for accurate and up-to-date cross-referencing.

The recommendation engine 112 is configured to conduct an impact analysis on the implementation of the recommendation engine using a machine learning model to determine the consequence of fixing the one or more vulnerabilities. The impact analysis evaluates the potential effects or consequences of a particular action or decision. In this context, it refers to assessing the outcomes that may result from implementing the recommendations provided by the engine to fix identified vulnerabilities. Therefore, the impact analysis helps to determine the effectiveness of fixing the one or more vulnerabilities. Specifically, it determines the potential side effects or unintended consequences that could occur if the vulnerabilities are addressed.

The machine learning model is trained with historical data, patterns, and rules so it can make predictions or decisions based on new data. Specifically, the training involves data related to past vulnerabilities and their remediation outcomes, configurations and system environments, and the effectiveness and impact of different types of fixes. In one embodiment, the machine learning model enables continuous learning and adaptation thereby ensuring the system remains updated with the latest vulnerability information and remediation techniques.

Further, the recommendation engine 112 is configured to generate a score matrix based on an impact with a predefined threshold limit. In one embodiment, the score matrix enables informed decision-making on which the one or more vulnerabilities are resolved. The score matrix is a structured table or framework used to rank or score vulnerabilities based on multiple factors, such as their severity, impact, likelihood of exploitation, and other relevant metrics. Further, the score matrix assigns a numerical score or ranking to each identified vulnerability, reflecting its priority for remediation. The scores in the matrix are typically based on results from the impact analysis conducted by the recommendation engine, which uses a machine learning model to predict the consequences of fixing each vulnerability.

The impact refers to the potential consequences or effects of a vulnerability on the system, application, or organization if it is exploited. Further, the impact may include but is not limited to, severity, exploitability, business impact and operational impact. The score matrix is generated using these impact factors to prioritize vulnerabilities that need to be addressed first. In one embodiment, the score matrix defines a priority for implementation of the one or more vulnerabilities.

The predetermined threshold limit is a specific score or value in the matrix that determines which vulnerabilities require immediate attention and action. If a vulnerability's score exceeds this threshold, it is prioritized for remediation. Conversely, if the score is below the threshold, it may be deferred or deemed a lower priority. It must be noted that the threshold is set based on the organization's risk tolerance, resources, security policies, and compliance requirements.

Furthermore, the recommendation engine 112 is configured to provide one or more recommendations to resolve the one or more vulnerabilities based on the score matrix generated and impact analysis. Typically, the recommendation engine 112 analyzes vulnerability reports, verifies them against external databases, conducts impact analysis, and ultimately provides recommendations for addressing vulnerabilities. The recommendation engine 112 uses the output from its previous analysis, specifically the score matrix and impact analysis to suggest the most effective and prioritized actions for resolving vulnerabilities. It must be noted that the primary function of the recommendation engine 112 is to generate actionable suggestions or steps to mitigate, remediate, or resolve the identified vulnerabilities. The recommendations are tailored to the specific context of the organization's environment, including its infrastructure, software, and threat landscape.

In one embodiment, the machine learning model provides recommendations on which of the identified one or more vulnerabilities are to be fixed. The machine learning model is trained on a variety of data, including historical vulnerability data, impact metrics, remediation outcomes, contextual information, and threat intelligence. This allows it to learn which vulnerabilities are most critical, how different remediation actions affect systems, and what the best course of action is for different types of vulnerabilities. The ML model provides a data-driven approach to vulnerability management by using a variety of inputs to assess risk and prioritize actions. Its recommendations are based on patterns learned from historical data and can be continuously improved as more data is fed into the model, making it more accurate over time.

The vulnerability remediation module 114 is operatively coupled to the recommendation engine wherein the vulnerability remediation module is configured to utilize one or more predefined threshold limits generated based on the score matrix to initiate automated vulnerability remediation thereby ensuring a secure and reliable development process.

In one embodiment, the one or more predefined threshold limits act as triggers to activate the system thereby ensuring integrity and security.

In one embodiment, the various functional components of the computer-implemented system may reside on a single computer, or they may be distributed across several computers in various arrangements. The various components of the computer-implemented system may, furthermore, access one or more databases, and each of the various components of the computer-implemented system may be in communication with one another. Further, while the components of FIG. 1 are discussed in the singular sense, it will be appreciated that in other embodiments multiple instances of the components may be employed.

Figure 2:
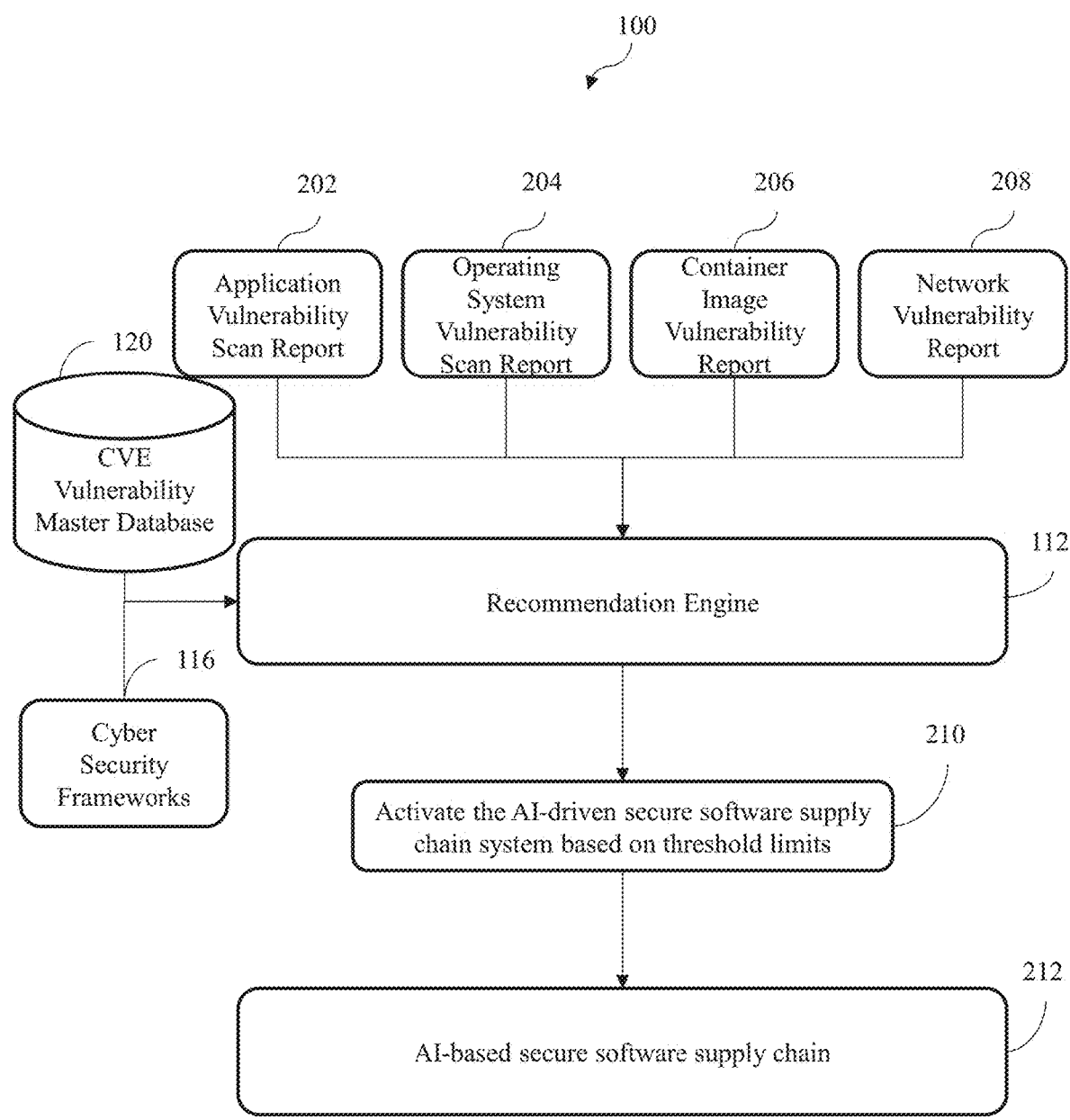
FIG. 2 is a block diagram representation of an overview of the computer-implemented system to analyze security across digital environments of FIG. 1 in accordance with an embodiment of the present disclosure.

FIG. 2 is a block diagram representation of an overview of the computer-implemented system to analyze security across digital environments of FIG. 1 in accordance with an embodiment of the present disclosure. FIG. 2 outlines an AI-based cybersecurity solution that includes a cybersecurity recommendation engine 112 and an AI-based secure software supply chain 212. The block diagram begins with four types of reports as follows:

1. Application Vulnerability Scan Report 202: This report identifies vulnerabilities in applications, such as code flaws, improper access controls, and misconfigurations.
2. OS (Operating System) Vulnerability Scan Report 204: This report identifies vulnerabilities in operating system components, such as outdated patches, security misconfigurations, and exploitable services.
3. Container Image Vulnerability Report 206: This report analyzes vulnerabilities in container images, such as Docker images, including outdated packages, insecure configurations, and embedded secrets.
4. Network Vulnerability Report 208: This report assesses vulnerabilities in network configurations, protocols, services, and devices that could be exploited to gain unauthorized access or disrupt services.

It will be appreciated to those skilled in the art that the plurality of reports are not limited to the said application vulnerability scan report, operating system vulnerability scan report, container image vulnerability report and network vulnerability report.

The recommendation engine 112 is the core component that processes the vulnerability scan results and uses AI to provide insights and recommendations. The recommendation engine 112 analyzes the plurality of reports. Further, the recommendation engine 112 verifies the plurality of reports by cross-referencing with the CVE database 120 to provide a rationalized and comprehensive view of the one or more identified vulnerabilities. Further, the recommendation engine 112 conducts an impact analysis on the implementation using a machine learning model to determine the consequence of fixing the one or more vulnerabilities. A score matrix is generated based on the impact to establish a predetermined threshold limit. Based on the score metrics generated by the recommendation engine 112, predefined threshold limits are established. These thresholds serve as triggers to activate the AI-driven Secure Software Supply Chain system to ensure the environment's integrity and security. The threshold limits define which vulnerabilities require immediate automated remediation based on their risk level. Subsequently, one or more recommendations are provided to resolve the one or more vulnerabilities based on the score matrix generated and impact analysis.

The AI-based secure software supply chain 212 is responsible for the actual remediation of vulnerabilities based on the inputs from the recommendation engine.

In a non-limiting example involving a large financial institution "Shield Bank" that operates a complex software delivery pipeline that includes various components such as web applications, internal tools, containerized microservices, and network infrastructure. The bank must ensure that its software environment is secure and complies with stringent regulatory requirements.

The process begins with scanning various components of the software environment (applications, OS, containers, and network) for vulnerabilities. Each scan generates a report that identifies specific vulnerabilities present in the component. The AI-based Cyber Security Recommendation Engine receives these reports and analyzes the vulnerabilities by comparing them against the CVE database and cybersecurity frameworks. The recommendation engine 112 uses AI models to perform impact analysis and generate a scoring matrix, which ranks vulnerabilities based on their potential risk. The recommendation engine generates a score matrix where Vulnerability X has a score of 18, exceeding the predefined threshold limit of 15. The score matrix indicates that Vulnerability X has a high impact score of 17.5 due to its critical severity and high exploitability. The impact analysis reveals that Vulnerability X, if exploited, could result in a significant data breach and substantial financial loss. Based on this, the vulnerability remediation module 114 automatically initiates the remediation process. Based on this information, the recommendation engine suggests to apply the latest security patch provided by the software vendor immediately, temporarily restrict access to sensitive areas of the system until the patch is applied and implement real-time monitoring for suspicious activities that may indicate attempts to exploit the vulnerability.

Figure 3:
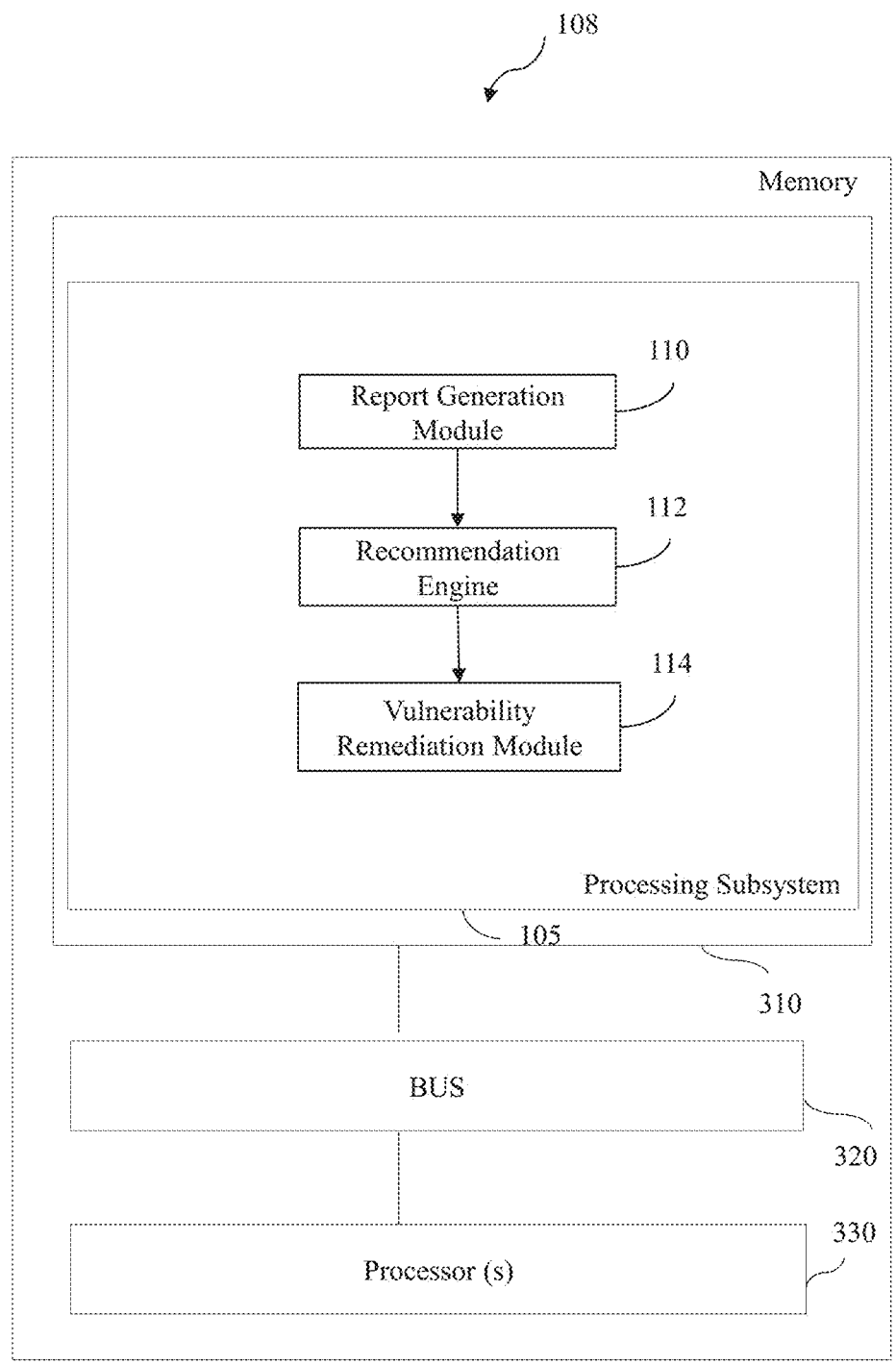
FIG. 3 is a block diagram of a computer or a server in accordance with an embodiment of the present disclosure; and FIG. 4a and FIG. 4b illustrates a flow chart representing the steps involved in a method to analyze security across digital environments in accordance with an embodiment of the present disclosure.

FIG. 3 is a block diagram of a computer or a server in accordance with an embodiment of the present disclosure. The server 108 includes processor(s) 330, and memory 310 operatively coupled to the bus 320. The processor(s) 330, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 310 includes several subsystems stored in the form of computer-readable medium which instructs the processor to perform the method steps illustrated in FIG. 1. The memory 310 includes several subsystems stored in the form of an executable program which instructs the processor 330 to perform the method steps illustrated in FIG. 1. The memory 310 includes a processing subsystem 105 of FIG. 1. The processing subsystem 105 further has following modules: a report generation module 110, a recommendation engine 112 and a vulnerability remediation module 114.

The report generation module 110 is configured to generate a plurality of reports stating one or more identified vulnerabilities pertaining to multiple components of a software delivery pipeline. The plurality of reports includes application vulnerability scan report, operating system vulnerability scan report, container image vulnerability report and network vulnerability report. The recommendation engine 112 operatively coupled to the report generation module 110 wherein the recommendation 112 engine is configured to perform a comprehensive analysis of the plurality of reports. The recommendation engine 112 is also configured to verify the plurality of reports by cross-referencing with a common vulnerabilities and exposures database to provide a rationalized and comprehensive view of the one or more identified vulnerabilities. Further, the recommendation engine 112 is configured to conduct an impact analysis on the implementation of the recommendation engine 112 using a machine learning model to determine the consequence of fixing the one or more vulnerabilities. Furthermore, the recommendation engine 112 is configured to generate a score matrix based on an impact with a predefined threshold limit. Moreover, the recommendation engine 112 is configured to provide one or more recommendations to resolve the one or more vulnerabilities based on the score matrix generated and impact analysis. The vulnerability remediation module 114 operatively coupled to the recommendation engine 112 wherein the vulnerability remediation module 114 is configured to utilize one or more predefined threshold limits generated based on the score matrix to initiate automated vulnerability remediation thereby ensuring a secure and reliable development process.

The bus 320 as used herein refers to internal memory channels or computer network that is used to connect computer components and transfer data between them. The bus 320 includes a serial bus or a parallel bus, wherein the serial bus transmits data in bit-serial format and the parallel bus transmits data across multiple wires. The bus 320 as used herein may include but not limited to, a system bus, an internal bus, an external bus, an expansion bus, a frontside bus, a backside bus, and the like.

Computer memory elements may include any suitable memory device(s) for storing data and executable program, such as read only memory, random access memory, erasable programmable read only memory, electrically erasable programmable read only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the processor(s) 330.

While computer-readable medium is shown in an example embodiment to be a single medium, the term "computer-readable medium" should be taken to include a single medium or multiple media (for example, a centralized or distributed database, or associated caches and servers) able to store the instructions. The term "computer readable medium" shall also be taken to include any medium that is capable of storing instructions for execution by the machine and that cause the machine to perform any one or more of the methodologies disclosed herein. The term "computer-readable medium" includes, but not to be limited to, data repositories in the form of solid-state memories, optical media, and magnetic media.

Figure 4A:
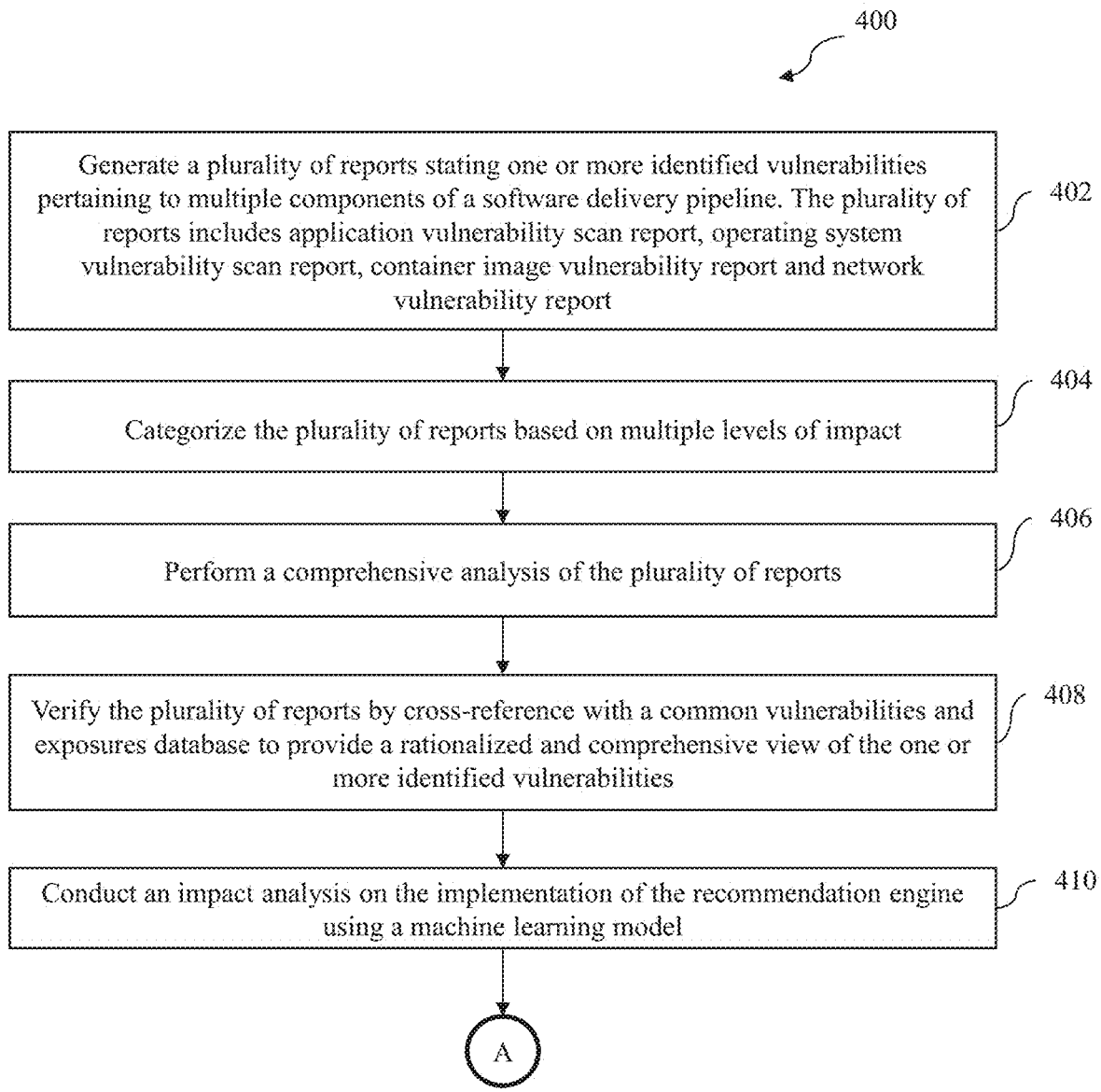
Figure 4B:
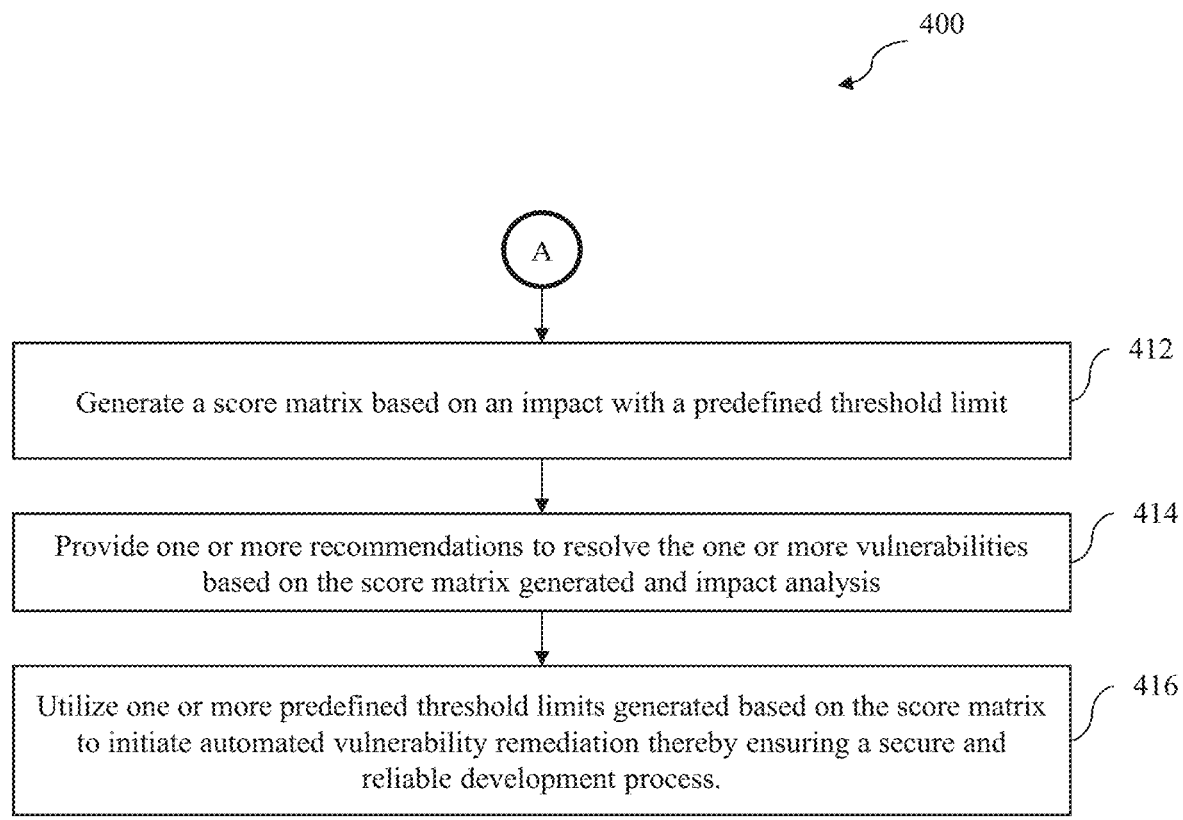

FIG. 4a and FIG. 4b illustrates a flow chart representing the steps involved in a method to analyze security across digital environments in accordance with an embodiment of the present disclosure. The method 400 begins at step 402.

At step 402, a plurality of reports stating one or more identified vulnerabilities pertaining to multiple components of a software delivery pipeline is generated by a report generation module. Typically, the reports identify vulnerabilities that have been discovered in the components of the software delivery pipeline. A software delivery pipeline includes all the stages and components involved in delivering a software product, such as development, testing, deployment and so on. In other words, the software delivery pipeline is a structured approach that combines automation, testing, deployment, and monitoring practices to deliver high-quality software efficiently and securely. Further, different tools and stages are used to build, test, and deploy the software.

The plurality of reports comprises application vulnerability scan report, operating system vulnerability scan report, container image vulnerability report and network vulnerability report. The application vulnerability scan report identifies vulnerabilities in the software applications themselves, such as coding flaws or security weaknesses. The operating system vulnerability scan report focuses on vulnerabilities found in the underlying operating system that hosts the applications. Likewise, the container image identifies security issues in the container images that are used in the software delivery pipeline. Further, the network vulnerability report identifies vulnerabilities in the network infrastructure, such as issues with firewalls, routers, or network configurations.

At step 404, the plurality of reports is categorized by the report generation module based on multiple levels of impact. The levels of impact refer to the severity or criticality of the identified vulnerabilities or issues. Specifically, the levels are high impact, medium impact and low impact. The high impact defines the vulnerabilities that pose a critical risk that could lead to data breaches, system failures, or significant downtime. The medium impact defines the vulnerabilities that are serious but may not immediately threaten the entire system, such as security flaws that require specific conditions to be exploited. Further, the low impact defines the vulnerabilities that have a minimal effect on the overall system's security or functionality.

It must be noted that categorizing reports by impact levels helps prioritize remediation efforts. For example, high-impact vulnerabilities would typically need to be addressed first, while lower-impact vulnerabilities could be scheduled for later remediation. Further, the categorization also provides clearer insights to stakeholders, such as security teams or management, about the overall risk posture and the areas requiring immediate attention.

At step 406, a comprehensive analysis of the plurality of reports is performed by a recommendation engine. In one embodiment, the plurality of reports are examined based on the following:

1. It evaluates the severity levels of the identified vulnerabilities (for example, critical, high, medium, low) to determine the potential risk they pose.
2. The analysis includes understanding which specific components of the software delivery pipeline are affected by the vulnerabilities.
3. The recommendation engine analyzes the interdependencies between different components or systems to assess how a vulnerability in one area could impact others.
4. Historical data and patterns of vulnerabilities, past incidents, or trends is considered to provide context to the current findings.
5. Other contextual factors, such as the deployment environment, compliance requirements, or business priorities, might be considered to understand the potential impact better.

After performing the comprehensive analysis, the recommendation engine may generate prioritized actions or recommendations for mitigating or remediating the identified vulnerabilities. For example:

1. Suggesting patches or updates for specific components.
2. Advising on configuration changes to mitigate risks.
3. Recommending additional security controls or monitoring for certain areas.
4. Providing a roadmap for addressing vulnerabilities based on their impact and urgency.

At step 408, the plurality of reports is verified by cross-referencing with a common vulnerabilities and exposures database to provide a rationalized and comprehensive view of the one or more identified vulnerabilities by the recommendation engine. The report verification process involves comparing or cross-referencing the vulnerabilities identified in the reports with the entries in the CVE database. This step checks whether each identified vulnerability in the reports matches a known vulnerability in the CVE database.

Cross-referencing helps to eliminate false positives (incorrectly identified vulnerabilities) or duplicates in the reports. It ensures that only verified and relevant vulnerabilities are considered for remediation. By referencing the CVE database a complete and consistent understanding of the vulnerabilities is obtained, including their severity, potential impact, and known fixes or workarounds. Further, cross-referencing provides improved accuracy with the latest industry standards and security intelligence.

At step 410, an impact analysis is conducted on the implementation of the recommendation engine using a machine learning model by the recommendation engine. The machine learning model is trained on historical data, including past incidents, vulnerabilities, mitigation efforts, and their outcomes. Further, the machine learning model is configured to predict the probable outcomes of implementing specific recommendations, including the likelihood of successfully mitigating a vulnerability or the risk of introducing new issues. It evaluates and quantifies the risk levels associated with different vulnerabilities and recommend the most efficient mitigation strategies.

At step 412, a score matrix is generated based on an impact with a predefined threshold limit. The score matrix establishes the threshold limit by assigning scores to each vulnerability or recommendation. These scores are used to rank or prioritize them based on their criticality, potential impact, and other relevant factors. In one embodiment, the threshold limit is predetermined.

At step 414, one or more recommendations is provided to resolve the one or more vulnerabilities based on the score matrix generated and impact analysis by the recommendation engine. Using the score matrix and impact analysis, the most appropriate and effective recommendations that fall above the predetermined threshold limit are selected to established in the score matrix. This ensures that the focus is on high-priority vulnerabilities that require immediate attention.

At step 416, one or more predefined threshold limits generated based on the score matrix is utilized to initiate automated vulnerability remediation thereby ensuring a secure and reliable development process by a vulnerability development process.

The vulnerability management process orchestrates the automation of remediation actions based on the predefined threshold limits. It ensures that critical vulnerabilities are addressed promptly while maintaining a secure and smooth development workflow. The process also monitors the outcomes of automated actions to verify their effectiveness and adjust as necessary.

The method ends at step 416.

Various embodiments of the computer-implemented system and method to analyze security across digital environments provides several benefits. One such benefit is that the report generation module 110 analyzes multiple components of the software delivery pipeline thereby ensuring a holistic view of all potential vulnerabilities. Further, by continuously cross-referencing vulnerabilities with the Common Vulnerabilities and Exposures (CVE) database 120 the system stays up to date with the latest threats, ensuring accurate and relevant vulnerability identification. The AI-based recommendation engine 112 provides a deeper understanding of vulnerabilities by performing impact analysis, predicting potential consequences, and assigning a severity score based on factors like exploitability and potential damage. The use of a scoring matrix allows the system to prioritize vulnerabilities based on their potential impact, ensuring that resources are focused on the most critical issues first. Further, the automated remediation minimizes the time between vulnerability detection and resolution, reducing the window of exposure and mitigating the risk of exploitation. Furthermore, The AI-based system can handle large-scale environments with numerous components, making it suitable for organizations of all sizes.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application-specific integrated circuits (ASICs), field-programmable gate arrays (FPGAs), or any other equivalent integrated or discrete logic circuitry, as well as any combinations of such components. The term "processor" or "processing subsystem" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:
1. A computer-implemented system to analyze security across digital environments comprising:
a hardware processor; and
a memory coupled to the hardware processor, wherein the memory comprises a set of program instructions in the form of a processing subsystem, configured to be executed by the hardware processor, wherein the processing subsystem hosted on a server and configured to execute on a network to control bidirectional communications among a plurality of modules comprising:
report generation module configured to generate a plurality of reports stating one or more identified vulnerabilities pertaining to multiple components of a software delivery pipeline, wherein the plurality of reports comprises application vulnerability scan report, operating system vulnerability scan report, container image vulnerability report and network vulnerability report;
a recommendation engine operatively coupled to the report generation module wherein the recommendation engine is configured to:
perform a comprehensive analysis of the plurality of reports;
verify the plurality of reports by cross-referencing with a common vulnerabilities and exposures database to provide a rationalized and comprehensive view of the one or more identified vulnerabilities;
conduct an impact analysis on the implementation of the recommendation engine using a machine learning model to determine the consequence of fixing the one or more vulnerabilities;
generate a score matrix based on an impact with a predefined threshold limit;
provide one or more recommendations to resolve the one or more vulnerabilities based on the score matrix generated and impact analysis;
a vulnerability remediation module operatively coupled to the recommendation engine wherein the vulnerability remediation module is configured to utilize one or more predefined threshold limits generated based on the score matrix to initiate automated vulnerability remediation thereby ensuring a secure and reliable development process.

2. The computer-implementation system of claim 1, wherein the report generation module is configured to categorize the plurality of reports based on multiple levels of implementation of the impact.

3. The computer-implemented system of claim 1, wherein the machine learning model enables continuous learning and adaptation thereby ensuring the system remains updated with the latest vulnerability information and remediation techniques.

4. The computer-implemented system of claim 1, wherein the score matrix enables informed decision-making on which the one or more vulnerabilities are resolved.

5. The computer-implemented system of claim 1, wherein the multiple components of the system comprises operating system, applications, containers, databases and network.

6. The computer-implemented system of claim 1, wherein the plurality of reports are verified with a cyber security framework.

7. The computer-implemented system of claim 1, wherein the one or more predefined threshold limits act as triggers to activate the system thereby ensuring integrity and security.

8. The computer-implemented system of claim 1, wherein the machine learning model provides recommendations on which of the identified one or more vulnerabilities are to be fixed.

9. The computer-implemented system of claim 1, wherein the common vulnerabilities and exposures database is updated with latest vulnerabilities at regular intervals of time.

10. The computer-implemented system of claim 1, wherein the score matrix defines a priority for implementation of the one or more vulnerabilities.

11. A computer-implemented method to analyze security across digital environments comprising:
generating, by a report generation module, a plurality of reports stating one or more identified vulnerabilities pertaining to multiple components of a software delivery pipeline, wherein the plurality of reports comprises application vulnerability scan report, operating system vulnerability scan report, container image vulnerability report and network vulnerability report;
categorizing, by the report generation module, the plurality of reports based on multiple levels of impact;
performing, by a recommendation engine, a comprehensive analysis of the plurality of reports;
verifying, by the recommendation engine, the plurality of reports by cross-reference with a common vulnerabilities and exposures database to provide a rationalized and comprehensive view of the one or more identified vulnerabilities;
conducting, by the recommendation engine, an impact analysis on the implementation of the recommendation engine using a machine learning model;
generating, by the recommendation engine, a score matrix based on an impact with a predefined threshold limit;
providing, by the recommendation engine, one or more recommendations to resolve the one or more vulnerabilities based on the score matrix generated and impact analysis; and
utilizing, by a vulnerability remediation module, one or more predefined threshold limits generated based on the score matrix to initiate automated vulnerability remediation thereby ensuring a secure and reliable development process.

12. A non-transitory computer-readable medium storing a computer program that, when executed by a processor, causes the processor to perform a computer-implemented method to analyze security across digital environments, wherein the computer-implemented method comprises:
generating, by a report generation module, a plurality of reports stating one or more identified vulnerabilities pertaining to multiple components of a software delivery pipeline, wherein the plurality of reports comprises application vulnerability scan report, operating system vulnerability scan report, container image vulnerability report and network vulnerability report;
categorizing, by the report generation module, the plurality of reports based on multiple levels of impact;
performing, by a recommendation engine, a comprehensive analysis of the plurality of reports;
verifying, by the recommendation engine, the plurality of reports by cross-reference with a common vulnerabilities and exposures database to provide a rationalized and comprehensive view of the one or more identified vulnerabilities;

conducting, by the recommendation engine, an impact analysis on the implementation of the recommendation engine using a machine learning model;
generating, by the recommendation engine, a score matrix based on an impact with a predefined threshold limit;
providing, by the recommendation engine, one or more recommendations to resolve the one or more vulnerabilities based on the score matrix generated and impact analysis; and
utilizing, by a vulnerability remediation module, one or more predefined threshold limits generated based on the score matrix to initiate automated vulnerability remediation thereby ensuring a secure and reliable development process.

* * * * *